United States Patent
Patel et al.

(10) Patent No.: US 11,674,069 B2
(45) Date of Patent: Jun. 13, 2023

(54) SYNTHETIC LAYERED MAGNESIUM SILICATES AND THEIR DERIVATIVES FOR HIGH PERFORMANCE OIL-BASED DRILLING FLUIDS

(71) Applicant: Saudi Arabian Oil Company, Dhahran (SA)

(72) Inventors: Hasmukh Patel, Houston, TX (US); Ashok Santra, Houston, TX (US); Carl Thaemlitz, Houston, TX (US)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 17/395,129

(22) Filed: Aug. 5, 2021

(65) Prior Publication Data
US 2021/0363400 A1    Nov. 25, 2021

Related U.S. Application Data

(62) Division of application No. 16/560,659, filed on Sep. 4, 2019, now Pat. No. 11,118,092.
(Continued)

(51) Int. Cl.
*C09K 8/03* (2006.01)
*C01B 33/32* (2006.01)
(Continued)

(52) U.S. Cl.
CPC ............... *C09K 8/03* (2013.01); *C01B 33/22* (2013.01); *C01B 33/325* (2013.01); *C07F 7/087* (2013.01); *C09K 8/06* (2013.01); *C09K 8/22* (2013.01)

(58) Field of Classification Search
None
See application file for complete search history.

(56) References Cited

U.S. PATENT DOCUMENTS

| | | | |
|---|---|---|---|
| 4,312,765 A | 1/1982 | Block | |
| 4,363,736 A | 12/1982 | Block | |

(Continued)

FOREIGN PATENT DOCUMENTS

| | | |
|---|---|---|
| CN | 101560686 A | 10/2009 |
| CN | 102041368 A | 5/2011 |

(Continued)

OTHER PUBLICATIONS

Bocchini et al., "One-pot Synthesis of Hexadecyl Modified Layered Magnesium Silicate and Polyethylene Based Nanocomposite Preparation", Applied Clay Science 80-81 (2013) 320-325.
(Continued)

*Primary Examiner* — Jeffrey D Washville
(74) *Attorney, Agent, or Firm* — Bracewell LLP; Constance G. Rhebergen; Eleanor L. Tyson

(57) ABSTRACT

A method of producing a synthetic functionalized additive including the steps of mixing an amount of a magnesium salt with a fluid medium to produce a magnesium-containing fluid, adding an amount of a silane to the magnesium-containing fluid to produce a reactant mix, adding an amount of an aqueous hydroxide to the reactant mix to produce a reaction mixture, mixing the reaction mixture for a mix period, refluxing the reaction mixture for a reflux period to produce a product mix, treating the product mix to separate the synthetic functionalized additive.

5 Claims, 7 Drawing Sheets

Related U.S. Application Data

(60) Provisional application No. 62/726,512, filed on Sep. 4, 2018.

(51) Int. Cl.
  *C01B 33/22* (2006.01)
  *C07F 7/08* (2006.01)
  *C09K 8/06* (2006.01)
  *C09K 8/22* (2006.01)

(56) References Cited

U.S. PATENT DOCUMENTS

| | | | |
|---|---|---|---|
| 4,770,894 | A | 9/1988 | Usui et al. |
| 4,830,843 | A | 5/1989 | Usui et al. |
| 6,475,959 | B1 | 11/2002 | Lange et al. |
| 6,737,384 | B2 | 5/2004 | Rayborn |
| 7,135,231 | B1 | 11/2006 | Sinclair |
| 7,449,164 | B2 | 11/2008 | Pinnavaia et al. |
| 7,591,313 | B2 | 9/2009 | Weaver et al. |
| 7,741,250 | B2 | 6/2010 | Patel et al. |
| 7,758,689 | B2 | 7/2010 | Li et al. |
| 8,074,715 | B2 | 12/2011 | Rispler et al. |
| 8,142,752 | B2 | 3/2012 | Kovanda et al. |
| 8,202,501 | B2 | 6/2012 | Martin et al. |
| 9,145,510 | B2 | 9/2015 | Crews et al. |
| 9,167,830 | B2 | 10/2015 | Combs et al. |
| 9,297,244 | B2 | 3/2016 | Mahoney et al. |
| 9,969,921 | B2 | 5/2018 | Wang et al. |
| 10,059,869 | B2 | 8/2018 | Singh et al. |
| 10,113,098 | B2 | 10/2018 | Galindo et al. |
| 10,196,553 | B2 | 2/2019 | Patil et al. |
| 2003/0096143 | A1 | 5/2003 | Lasmarias et al. |
| 2004/0108113 | A1 | 6/2004 | Luke et al. |
| 2006/0021945 | A1* | 2/2006 | Pinnavaia ............ B01J 20/10 210/688 |
| 2006/0201815 | A1 | 9/2006 | Separautzki et al. |
| 2009/0131280 | A1 | 5/2009 | Federici et al. |
| 2011/0180256 | A1 | 7/2011 | Tehrani et al. |
| 2012/0024659 | A1 | 2/2012 | Mizoro |
| 2013/0217603 | A1 | 8/2013 | Jamison et al. |
| 2013/0323507 | A1 | 12/2013 | Rudenko |
| 2014/0205528 | A1 | 7/2014 | Le Roux et al. |
| 2016/0186034 | A1 | 6/2016 | Mainye et al. |
| 2017/0137702 | A1 | 5/2017 | Khlestkin et al. |
| 2018/0037795 | A1* | 2/2018 | Goel ....................... C09K 8/493 |
| 2019/0040296 | A1* | 2/2019 | Panamarathupalayam ................... C09K 8/36 |
| 2020/0190384 | A1 | 6/2020 | Patel et al. |

FOREIGN PATENT DOCUMENTS

| | | |
|---|---|---|
| CN | 104098930 A | 10/2014 |
| CN | 108505392 A | 9/2018 |
| WO | 2012043180 A1 | 4/2012 |
| WO | 2016183181 A1 | 11/2016 |
| WO | 2018101929 A1 | 6/2018 |

OTHER PUBLICATIONS

Burkett et al., "Synthesis, Characterization, and Reactivity of Layered Inorganic-Organic Nanocomposites Based on 2:1 Trioctahedral Phyllosilicates", Chemistry of Materials, 1997, pp. 1071-1073, American Chemical Society.

Chabrol et al., "Functionalization of synthetic talc-like phyllosilicates by alkoxyorganosilane grafting", 20 J. Mater. Chem. 9695-9706 (2010).

Claverie et al., "Synthetic Talc and Talc-like Structures: Preparation, Features and Applications", 24 Chem. Eur. J. 519-542 (2018).

Fonseca et al., "Aminated Phyllosilicates Synthesized via a Sol-Gel Process", Langmuir 1999, 15, 5048-5055.

Fonseca et al., "New Amino-Inorganic Hybrids From Talc Silylation and Copper Adsorption Properties", 36 Materials Research Bulletin 277-287 (2001).

Gallego et al., "Synthesis of New Lamellar Inorganic-Organic Talc-Like Hybrids", 32 New J. Chem. 407-412 (2008).

International Search Report and Written Opinion for related PCT application PCT/US2019/049459 dated Jan. 31, 2020. (SA5953PCT).

Moscofian et al., "Stability of layered aluminum and magnesium organosilicates", Microporous and Mesoporous Materials, 2008, pp. 113-120, Elsevier.

Moscofian et al., "Synthesized layered inorganic-organic magnesium organosilicate containing a disulfide moiety as a promising sorbent for cations removal", Journal of Hazardous Materials, 2008, pp. 63-69, Elsevier.

Moura et al., "Physico-chemical of organo-functionalized magnesium phyllosilicate prepared by microwave heating", Microporous and Mesoporous Materials, 2014, pp. 292-300, Elsevier.

Patel et al., "Synthetic Talc as a Solid Base Catalyst for Condensation of Aldehydes and Ketones", Journal of Molecular Catalysis A: Chemical 286 (2008) 31-40.

Samayamutthirian Palaniandy et al., "Production of Talc Nanosheets via Fine Grinding and Sonication Processes", 6 J. Nuclear Tech. 255-265 (2009).

Sharma et al., "Synthesis of Jasminaldehyde Using Magnesium Organo Silicate as a Solid Base Catalyst", Journal of Molecular Catalysis A: Chemical 280 (2008) 61-67.

Silva et al., "Layered Inorganic-Organic Talc-like Nanocomposites", Chem. Mater. 2002, 14, 175-179.

Young-Chul Lee, Dual-end Functionalized Magnesium Organo-(phyllo)Silicates Via Co-Condensation and its Antimicrobial Activity, 83-84 Applied Clay Sci. 474-485 (2013).

International Search Report and Written Opinion for International Application No. PCT/US2021/070199 (SA51271), report dated Jun. 18, 2021; pp. 1-12.

Lagadic, I.L.; "Schiff base chelate-functionalized organoclays" Microporous and Mesoporous Materials 95 (2006); pp. 226-233.

Patel, Hasmukh A. et al.; "Covalently-Linked Organic Functionalities on Nano-Platelets as a Viscosifier for Oil-Based Muds" SPE-193588-MS, SPE International Conference on Oilfield Chemistry, Galveston, TX, Apr. 8-9, 2019; pp. 1-10.

Patel, Hasmukh A. et al.; "Organically modified layered magnesium silicates to improve rheology of reservoir drilling fluids" Nature, Scientific Reports (2020) 10:13851; pp. 1-10.

* cited by examiner

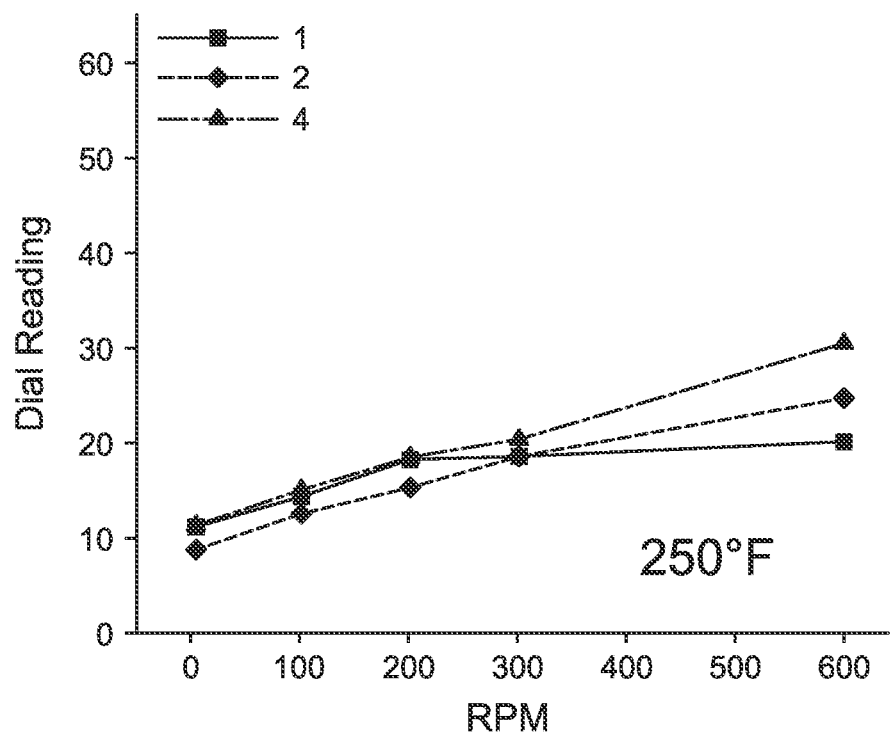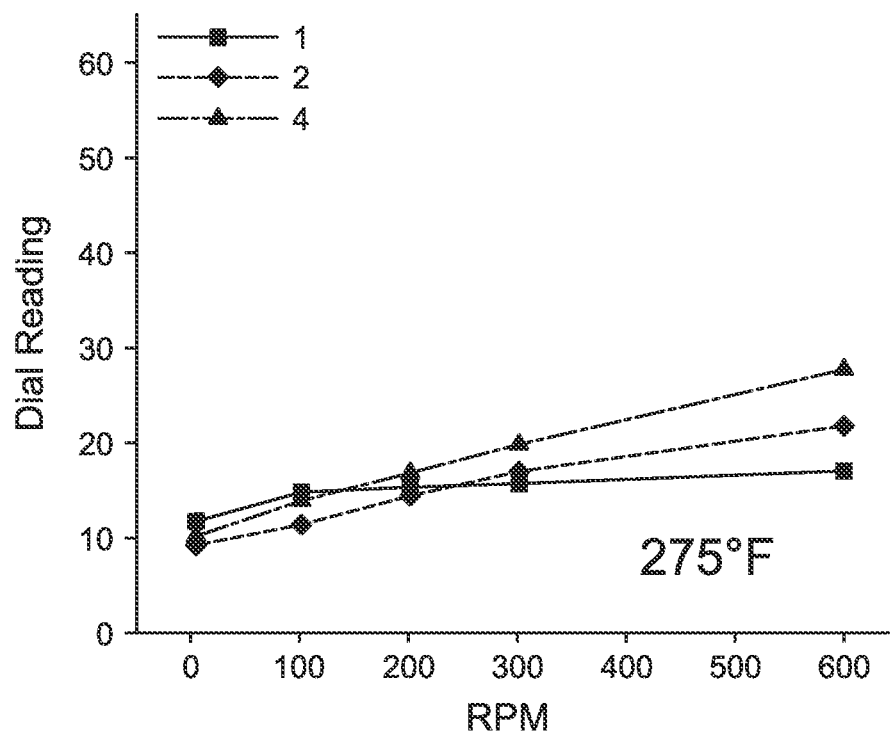
FIG. 4B

SYNTHETIC LAYERED MAGNESIUM SILICATES AND THEIR DERIVATIVES FOR HIGH PERFORMANCE OIL-BASED DRILLING FLUIDS

RELATED APPLICATIONS

This application claims priority from U.S. Non-Provisional patent application Ser. No. 16/560,659 filed on Sep. 4, 2019, which claims priority from U.S. Provisional Patent Application No. 62/726,512 filed on Sep. 4, 2018. For purposes of United States patent practice, this application incorporates the contents of both the Provisional Patent Application and the Non-Provisional Patent Application by reference in their entirety.

TECHNICAL FIELD

Disclosed are compositions and methods for use as fluid additives. Specifically, disclosed are compositions and methods for enhancing rheological properties of drilling fluids in a downhole environment.

BACKGROUND

Organically modified smectitic materials, such as bentonite and other montmorillonites, and hectorites can be utilized as viscosifiers in drilling fluids. These materials are composed of layered inorganic materials, such as aluminosilicates and magnesium silicates. Organic modifiers, such as aliphatic and aromatic quaternary ammonium salts, in these viscosifiers are linked with ionic interaction on the surface of the layered inorganic materials, see FIG. 1. These weak interactions between organic moieties and the layered inorganic materials are susceptible to failure under high temperatures, such as temperatures up to 500 degrees Fahrenheit (° F.), high pressures, such as pressures up to 35,000 pounds per square inch (psi), shearing stresses, and repeated exposure to alkaline or acidic conditions.

The ionic interactions are indicated by plus signs and minus signs. As shown in FIG. 1, when the weak interactions fail the layers break apart. A failure of the interaction between the organic moieties and the layered inorganic materials negates the intended effectiveness of the material in its application.

Additionally, traditional viscosifiers are primarily obtained from natural resources. As a result, the chemical composition of the viscosifiers changes from batch to batch. The changes from batch to batch require frequent optimization of drilling fluids formulations during one drilling operation.

SUMMARY

Disclosed are compositions and methods for use as fluid additives. Specifically, disclosed are compositions and methods for enhancing rheological properties of drilling fluids in a downhole environment.

In a first aspect, a method of producing a synthetic functionalized additive is provided. The method includes the steps of mixing an amount of a magnesium salt with a fluid medium to produce a magnesium-containing fluid, adding an amount of a silane to the magnesium-containing fluid to produce a reactant mix, adding an amount of an aqueous hydroxide to the reactant mix to produce a reaction mixture, mixing the reaction mixture for a mix period, refluxing the reaction mixture for a reflux period to produce a product mix, treating the product mix to separate the synthetic functionalized additive.

In certain aspects, the magnesium salt is selected from the group consisting of magnesium chloride, magnesium chloride hydrates, magnesium nitrate, magnesium nitrate hydrates, magnesium bromide, magnesium bromide hexahydrate, and combinations of the same. In certain aspects, the amount of the magnesium salt is between 3 percent by weight (% by wt) and 15% by wt of the fluid medium. In certain aspects, the fluid medium is selected from the group consisting of water, an alcohol, and combinations of the same. In certain aspects, the silane is selected from the group consisting of phenyltrimethoxysilane, trimethoxy(propyl) silane, trimethoxymethylsilane, hexadecyltrimethoxysilane, octyltriethoxysilane, tetraethyl orthosilicate, N-[3-(trimethoxysilyl)propyl]ethylenediamine, (3-aminopropyl) triethoxysilane, and combinations of the same. In certain aspects, the amount of the silane is between 3% by wt and 12% by wt of the fluid medium, such that a molar ratio of silicone to magnesium in the synthetic functionalized additive is in a range between 0.7 and 1.5. In certain aspects, the aqueous hydroxide includes a hydroxide, the hydroxide selected from the group consisting of sodium hydroxide, potassium hydroxide, ammonium hydroxide, and combinations of the same. In certain aspects, the amount of the aqueous hydroxide is added to the reactant mix to achieve a target pH of the reaction mixture, where the target pH is between 7 and 12. In certain aspects, the mix period is between one hour and seventy-two hours. In certain aspects, the synthetic functionalized additive includes a synthetic layered magnesium silicate and a functional group. In certain aspects, the functional group is selected from the group consisting of hydroxyl groups (—OH), saturated alkyl groups having the formula (—$CH_2(CH_2)_xCH_3$), where x is an integer between 0 and 18, phenyl groups, amine groups, diamine groups, carboxylate groups, amide groups, acrylate groups, thiol groups, methacrylate groups, isocyanate groups, and combinations of the same. In certain aspects, the step of treating the product mix to separate the synthetic functionalized additive includes the steps of reducing the temperature of the product mix, separating solids in the product mix from a liquid in the product mix in a solids separator, and drying the solids separated in the solids separator to produce the synthetic functionalized additive.

In a second aspect, a composition of a synthetic functionalized additive is provided. The composition includes a synthetic layered magnesium silicate that includes a first functionalized silicate layer that includes a tetrahedral silicate layer and a functional group. The synthetic layered magnesium silicate further includes an octahedral brucite layer that includes magnesium oxide/hydroxide. The synthetic layered magnesium silicate further includes a second functionalized silicate layer that includes the tetrahedral silicate layer and the functional group. The octahedral brucite layer is positioned between the first functionalized silicate layer and the second functionalized silicate layer. The composition further includes the functional group covalently bonded to the tetrahedral silicate layer of the first functionalized silicate layer and separately covalently bonded to the tetrahedral silicate layer of the second functionalized silicate layer, where the functional group extends from both the first functionalized silicate layer and the second functionalized silicate layer away from the octahedral brucite layer.

In certain aspects, a thickness of the synthetic layered magnesium silicate is 1 nanometer and a lateral dimension of the synthetic layered magnesium silicate is between 2 nanometers (nm) and 5 microns.

In a third aspect, a method of using a synthetic functionalized additive in a well fluid is provided. The method includes the steps of preparing a well fluid, where the well fluid is selected from an aqueous-based fluid, oil-based fluid, and combinations of the same, adding an amount of the synthetic functionalized additive to the well fluid to produce a rheologically-modified well fluid, subjecting the rheologically-modified well fluid to a shear stress, and injecting the rheologically-modified well fluid into a well.

In certain aspects, the amount of the synthetic functionalized additive in the rheologically-modified well fluid is between 0.1 percent of weight in the total volume (% w/v) to 20% w/v. In certain aspects, the rheologically-modified well fluid is operable to exhibit rheologically-independent behavior.

BRIEF DESCRIPTION OF THE DRAWINGS

These and other features, aspects, and advantages of the scope will become better understood with regard to the following descriptions, claims, and accompanying drawings. It is to be noted, however, that the drawings illustrate only several embodiments and are therefore not to be considered limiting of the scope as it can admit to other equally effective embodiments.

FIG. 4B is graphs of the results of Example 2 of the low shear dial readings versus speed at different temperatures.

Figure 1:
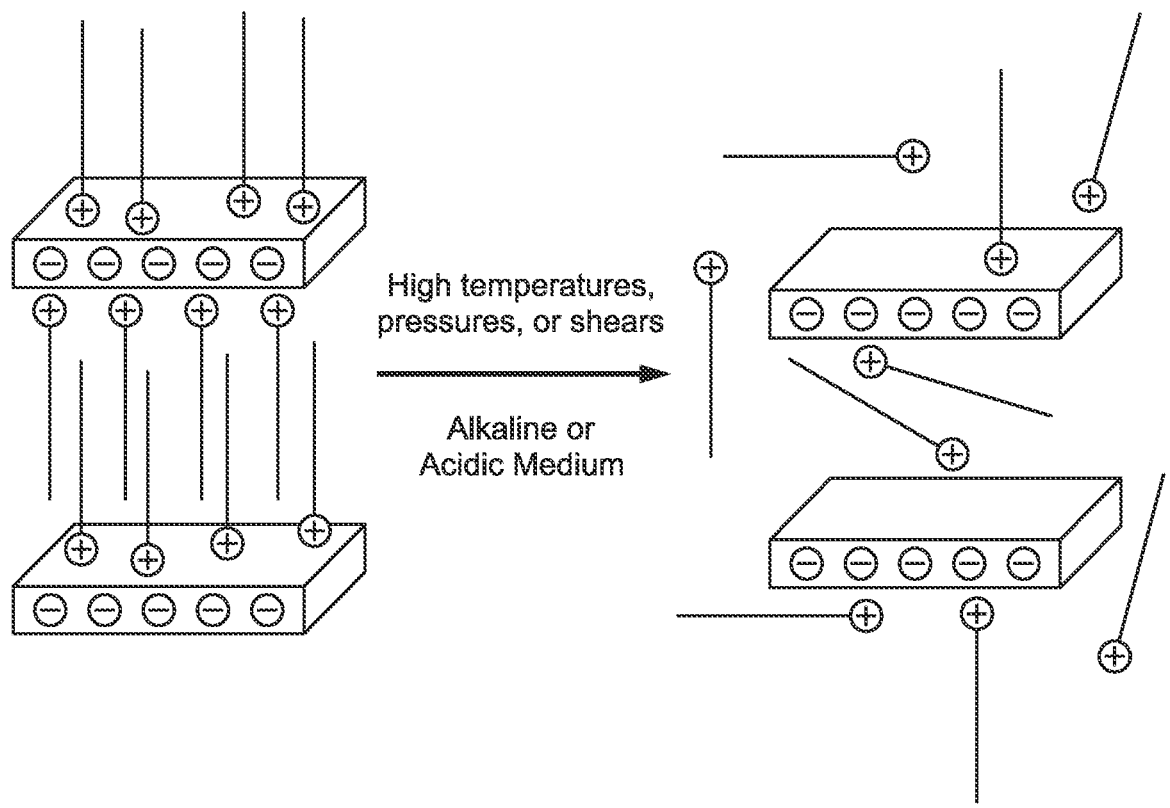
FIG. 1 provides a pictorial representation of organic modifiers attached to a traditional viscosifier through labile electrostatic interaction.

In the accompanying Figures, similar components or features, or both, may have a similar reference label.

DETAILED DESCRIPTION

While the scope of the composition and method will be described with several embodiments, it is understood that one of ordinary skill in the relevant art will appreciate that many examples, variations and alterations to the composition and methods described here are within the scope and spirit of the disclosure.

Accordingly, the embodiments described are set forth without any loss of generality, and without imposing limitations, on the disclosure. Those of skill in the art understand that the scope includes all possible combinations and uses of particular features described in the specification.

The compositions and methods are directed to synthetic functionalized additives. The synthetic functionalized additives can be used in drilling fluids. The synthetic functionalized additives can include organic functional groups covalently bonded to synthetic layered magnesium silicate. The methods include making the synthetic layered magnesium silicate and preparing the synthetic functionalized additives. The synthetic layered magnesium silicates are polycrystalline materials and not single crystals.

Advantageously, the synthetic functional additives contain strong covalent bonds between the organic functional groups and the synthetic layered magnesium silicate which reduce the effects of stresses on the bonds meaning more bonds remain intact during a treatment process. With more bonds remaining intact, the covalent bonds increase the effectiveness of the synthetic functional additives. Advantageously, the synthetic layered magnesium silicates can be reproduced resulting in consistent composition from batch to batch. Consistent and reproducible results is an advantage over naturally-derived materials, such as organoclays or organically modified layered materials, which are subject to the impurities in the natural source. Additionally, the synthesis can be manipulated to produce certain results in the product, such as changing the crystallinity. Advantageously, the synthetic layered magnesium silicates provide consistency for the duration of an application and reduce or eliminate the need to alter the formulation during use and application. Advantageously, the synthetic functional additives can be prepared in one-pot synthesis approaches reproducible at industrial-scale. Advantageously, fluids containing the synthetic functional additives exhibit rheologically-independent behavior at pressures up to 35,000 psi and temperatures up to 500° F., which is advantageous because having rheologically-independent behavior means the fluids maintain their properties, such as viscosity and thixotropy, in the face of an applied stress and changes to the temperature. Fluids containing the synthetic functional additives are less susceptible to stresses than fluids that do not exhibit rheologically-independent behavior. Advantageously, fluids containing the synthetic functional additives exhibit less change in viscosity due to variation in temperature as compared to the same fluids containing conventional rheology modifiers, such as organoclays. Advantageously, fluids containing the synthetic functional additives exhibit reductions in friction factor as compared to the same fluids containing conventional rheology modifiers, such as organoclays. Advantageously, the synthetic functional additives contain organophilic and hydrophilic functionalities.

As used throughout, "brucite" refers to a magnesium oxide/hydroxide having monomeric formula $MgO(OH)_2$.

As used throughout, "octahedral" refers to the crystal pattern defining an octahedron, with eight triangular faces, twelve straight edges, and six vertices.

As used throughout, "tetrahedral" refers to the crystal pattern defining a tetrahedron, with four triangular faces, six straight edges, and four vertices.

As used throughout, "silane" refers to a silicon compound containing at least three alkoxy groups (an alkyl group bonded to oxygen), where the $4^{th}$ substituent includes a functional group and can be a $4^{th}$ alkyoxy group or can be a carbon containing compound.

As used throughout, "viscosifier," "viscosity modifier," and "rheological modifier" refer to compounds that change rheological properties when added to a fluid. Primarily, viscosifiers are used to increase the viscosity of a fluid.

As used throughout, "thixotropic" refers to the tendency of a fluid or gel to exhibit a decrease in viscosity when a stress or a change in temperature is applied, such as mixing, shaking, shearing, or agitating. This property is time-dependent. Thixotropic control additives are additives that can minimize the decrease in viscosity of a fluid when a stress or a change in temperature is applied.

As used throughout, "suspension additives" refers to additives that can reduce settling of solid particles in fluids or gels.

As used throughout, "rheologically-independent behavior" refers to a fluid where the changes in rheological properties, such as viscosity and thixotropy, experience less than 10 percent (%) change due to a variation in an applied stress. Stresses can include shear stress, temperature, and combinations of the same. For example, an applied stress can be a rate of mixing and a variation in that applied stress would occur when the rate of mixing is being increased or decreased. An example of a fluid that exhibits rheologically-independent behavior is a fluid that does not experience a change in viscosity due to a variation in the temperature. An example of rheologically-independent behavior can be seen in FIG. 4C, where sample 1 of Example 2 exhibits minimal change in the dial reading over an increase in the RPM's at 300° F.

As used throughout, "talc" refers to a natural mineral composed of magnesium silicates formed naturally over thousands of years and is crystalline. Talc does not include organic functional groups.

The synthetic functionalized additive includes a synthetic layered magnesium silicate and a functional group. The synthetic layered magnesium silicate can have a thickness of about 1 nanometer (nm) and a lateral dimension in the range from 2 nanometers (nm) to 5 microns. The overall thickness of the synthetic functionalized additive can depend on the length of the functional groups.

The synthetic layered magnesium silicate includes a layer of octahedral brucite positioned between two functionalized silicate layers.

The layer of octahedral brucite can be synthesized as part of the process or can be obtained from other sources. The octahedral brucite layer can be synthesized by reacting a magnesium salt with an aqueous hydroxide. Any magnesium salt that can react with a hydroxide can be used. Examples of the magnesium salt can include magnesium chloride, magnesium chloride hydrates, magnesium nitrate, magnesium nitrate hydrates, magnesium bromide, magnesium bromide hexahydrate, and combinations of the same. Magnesium chloride hydrates have the chemical formula $MgCl_2(H_2O)_x$, where x is selected from 2, 4, 6, 8, and 12. Magnesium nitrate hydrates have the chemical formula $Mg(NO_3)_2(H_2O)_y$, where y is selected from 2 and 6. Other sources of octahedral brucite can include magnesium-rich bittern brine, a byproduct of sodium chloride production from sea water.

The aqueous hydroxide can include a hydroxide in water. The hydroxide can be present in an amount between 2% by wt and 10% by wt, alternately between 2% by wt and 8% by wt. The hydroxide can be any hydroxide that can react with a salt. Examples of the hydroxide include sodium hydroxide, potassium hydroxide, ammonium hydroxide, and combinations of the same.

Each of the functionalized silicate layers contains a tetrahedral silicate layer and a functional group. The functional groups are covalently bonded to the tetrahedral silicate layer. The functionalized silicate layers can be obtained by reacting the octahedral brucite with a silane. Any silane containing a functional group and capable of forming a tetrahedral layer can be used. The silanes can be available as an aqueous solution, a non-aqueous solution, or a liquid. Examples of silanes for use in the synthetic layered magnesium silicate include phenyltrimethoxysilane $[C_6H_5Si(OCH_3)_3]$, trimethoxy(propyl)silane $[CH_3CH_2CH_2Si(OCH_3)_3]$, trimethoxymethylsilane $[CH_3Si(OCH_3)_3]$, hexadecyltrimethoxysilane $[CH_3(CH_2)_{15}Si(OCH_3)_3]$, octyltriethoxysilane $[CH_3(CH_2)_7Si(OCH_3)_3]$, tetraethyl orthosilicate $[Si(OC_2H_5)_4]$, N-[3-(trimethoxysilyl)propyl]ethylenediamine $[NH_2(CH_2)NH(CH_2)_3Si(OCH_3)_3]$, (3-aminopropyl)triethoxysilane $[NH_2(CH_2)_3Si(OCH_3)_3]$, silanes having the formula $RSi(OR")_3$, and combinations of the same. Where silanes have the formula $RSi(OR")_3$, R" can include a methyl group ($—CH_3$), an ethyl group ($—C_2H_5$), and combinations of the same; and R can include alkyl groups, aryl groups, and combinations of the same. Alkyl groups can include alkyl groups having saturated groups, alkyl groups having unsaturated groups, alkyl groups having functional substituents, and combinations of the same. Aryl groups can include aryl groups having saturated groups, aryl groups having unsaturated groups, aryl groups having functional substituents, and combinations of the same. The functional substituents can include amines, carboxylates, amides, acrylates, thiols, hydroxyls, isocyanates, methacrylates and combinations of the same. The functional substituents can be attached at the end of the chain, can be attached in-between, and combinations of the same. The functional substituents form functional groups of the silane. In at least one embodiment, the silanes for use in the synthetic layered magnesium silicate include phenyltrimethoxysilane, trimethoxy(propyl)silane, trimethoxymethylsilane, hexadecyltrimethoxysilane, octyltriethoxysilane, tetraethyl orthosilicate, N-[3-(trimethoxysilyl)propyl]ethylenediamine, (3-aminopropyl)triethoxysilane, and combinations of the same. In at least one embodiment, the silane has the formula $RSi(OR")_3$.

The silane can be selected based on the desired functional group. The functional groups can include hydroxyl groups ($—OH$), saturated alkyl groups having the formula ($—CH_2(CH_2)_xCH_3$), x is an integer between 0 and 18, phenyl groups, amine groups, diamine groups, carboxylate groups, amide groups, acrylate groups, thiol groups, methacrylate groups, isocyanate groups, and combinations of the same. Table 1 lists the functional group resulting from each silane.

TABLE 1

Examples of silanes and the corresponding functional group

| Silane | Functional Group |
| --- | --- |
| phenyltrimethoxysilane | Phenyl group, $—C_6H_5$ |
| trimethoxy(propyl)silane | Saturated alkyl group, $—CH_2(CH_2)CH_3$ |
| trimethoxymethylsilane | Methyl group, $—CH_3$ |
| hexadecyltrimethoxysilane | Saturated alkyl group, $—CH_2(CH_2)_{14}CH_3$ |
| octyltriethoxysilane | Saturated alkyl group, $—CH_2(CH_2)_6CH_3$ |
| tetraethyl orthosilicate | $—OC_2H_5$ |
| N-[3-(trimethoxysilyl)propyl]ethylenediamine | Diamine group, $—(CH_2)_3NH(CH_2)_2NH_2$ |
| (3-aminopropyl)triethoxysilane | Amine group, $—(CH_2)_3NH_2$ |
| $RSi(OR")_3$ | R" is a methyl group ($—CH_3$), an ethyl group ($—C_2H_5$), and combinations of the same; and R is an alkyl group, an aryl group, and combinations of the same. |

Producing the functionalized silicate layer from a silane that contains the desired functional group results in a synthetic functionalized additive where the functional group is covalently bonded to the tetrahedral silicate layer of the synthetic layered magnesium silicate.

Figure 2:
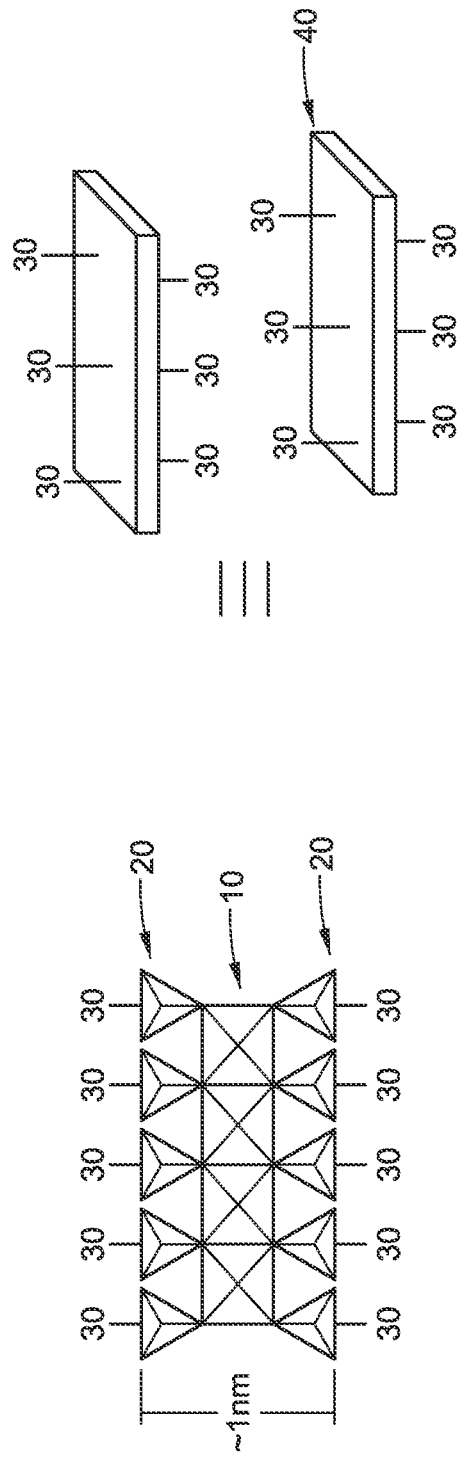
FIG. 2 provides a pictorial representation of a synthetic functionalized additive showing the synthetic layered magnesium silicate with covalently-linked organic functional groups.

Referring to FIG. 2 an embodiment of a functionalized silicate additive is provided. Octahedral brucite layer 10 is sandwiched between two tetrahedral silicate layers 20. Functional groups 30 are covalently bonded to tetrahedral silicate layer 20. As functional groups 30 extend from tetrahedral silicate layer 20 away from octahedral brucite layer 10, functional groups 30 serve to separate the synthetic layered magnesium silicate 40.

References to "a functional group" should be interpreted to include multiple instances a type of functional group bonded to the tetrahedral silicate layer and alternately multiple instances of multiple types of functional groups bonded to the tetrahedral silicate layer.

The synthetic layered magnesium silicate is in the absence of talc. The synthetic layered magnesium silicates differ from talc in at least the following ways: (a) the synthetic layered magnesium silicates include organic functionalities, unlike talc which does not; (b) the synthetic layered magnesium silicates are partially crystalline; (c) the synthetic layered magnesium silicates contain covalently linked organic functionalities resulting in chemically strong bonding in contrast talc, even organically modified talc, has physically linked organic functionalities resulting in weak bonding; and (d) the structure of the synthetic layered magnesium silicates can be controlled during the synthesis process, whereas the structure of talc cannot be modified from the natural development.

A method of producing or synthesizing the synthetic functionalized additive is provided.

In a first step, an amount of the magnesium salt is mixed with a fluid medium to produce a magnesium containing fluid. Any fluid medium suitable for suspending a metal oxide or metal hydroxide reaction. The fluid medium can include water, an alcohol, and combinations of the same. Examples of the alcohol can include methanol, ethanol, propanol, butanol, and combinations of the same. The amount of magnesium salt can be in the range from between about 3% by wt of the fluid medium and about 15% by wt of the fluid medium and alternately in the range from between about 5% by wt of the fluid medium and about 7% by wt of the fluid medium.

An amount of the silane can be added to the magnesium-containing fluid to produce a reactant mix. The amount of silane added can be between about 3% by wt of the fluid medium and about 12% by wt of the fluid medium and alternately between about 4% by wt of the fluid medium and about 6% by wt of the fluid medium. The amount of silane added can be determined to maintain a silicone to magnesium molar ratio in the synthetic layered magnesium silicate of between about 0.7 and about 1.5, alternately between about 0.8 and about 1.4, alternately between about 1 and about 1.4. In at least one embodiment, the amount of silane added results in a silicone to magnesium molar ratio in the synthetic layered magnesium silicate of 1.33.

Adding the amount of the silane to the magnesium-containing fluid is important to produce a synthetic functionalized additive having the layered structure. A change in the order of mixing, by adding the magnesium salt to the silane produces amorphous materials that do not possess the layered structure required of the synthetic functionalized additive.

An amount of aqueous hydroxide can be added to the reactant mix to produce the reaction mixture. The amount of aqueous hydroxide added can adjust the pH of the reactant mix. The amount of aqueous hydroxide can be added to the reactant mix to reach a target pH of the reaction mixture. The target pH of the reaction mixture can be between about 7 and about 12, and alternately between about 9 and about 10.

Each of the addition steps can be performed at a temperature in the range between about 20 degrees Celsius (° C.) and about 30° C. and alternately at a temperature of about 25° C. Each of the addition steps can be performed at ambient pressure. The reaction mixture can be prepared in one reaction vessel. The reaction vessel can be fitted with a stirring mechanism such that the mixture is constantly stirred during the addition steps. Each addition step can be followed by a period of mixing. The reaction vessel can be fitted with a condenser. The reaction vessel can be configured for hydrothermal reaction, where the reaction mixture can be maintained at a pressure at the reflux conditions.

The reaction mixture can be mixed for a mixing period. The mixing period can be at least 30 minutes, alternately at least one hour, alternately between one hour and seventy-two hours, alternately between 12 hours and 72 hours, alternately between 24 hours and 48 hours, alternately between four hours and eight hours, alternately between five hours and seven hours, and alternately between five hours and six hours. Mixing the reaction mixture under an alkaline condition can enable the formation of brucite and the subsequent hydrolysis of the silanes.

Following the mixing period, the reaction mixture can be refluxed in the reaction vessel for a reflux period to produce the product mix. The reflux period can be greater than 1 hour, alternately greater than 5 hours, alternately greater than 10 hours, alternately greater than 24 hours, alternately between 24 hours and 72 hours, alternately between 24 hours and 48 hours. During the reflux period, the temperature in the reaction vessel can be increased to the refluxing condition. The refluxing condition can be the boiling point of the reaction mixture. The refluxing condition can be in the range between 50° C. and 80° C. As components boil, they can enter the condenser fitted onto the reaction vessel. The refluxing condition allows the reaction of silanes to form the tetrahedral silicate layer on either side of the layer of octahedral brucite, resulting in the functionalized synthetic additive.

The formation of the layer of octahedral brucite can begin upon addition of the aqueous hydroxide. Hydrolysis of the silanes can begin upon addition of the aqueous hydroxide. The condensation reactions of the silanes can begin when the temperature in the reaction mixture is increased to the refluxing condition. The condensation reactions of the silanes continues for the reflux period. The functionalized silicate layers form on the layer of octahedral brucite during the reflux period.

Following the refluxing step, the product mix can be subjected to one or more treatment operations to separate the solid synthetic functionalized magnesium silicate from the mother liquids in the product mix. The treatment operations can include reducing the temperature of the product mix, separating the solid synthetic functionalized magnesium silicate, washing the separated solids, and drying the solids under vacuum. Separating the solid synthetic functionalized magnesium silicate can be performed using any separation unit capable of separating solids from liquids. Examples of separation units suitable for separating solids from liquids include filtration and centrifuging. The separated solids can be washed with de-ionized water. Drying under vacuum can be done at elevated temperatures or at room temperature.

The length of the reflux period can influence the crystallinity of the synthetic layered magnesium silicates. Hydrothermal reaction during the reflux period can allow crystallization and growth in the lateral dimension. The longer the reflux period the greater the size of the lateral dimension. The reflux conditions can also improve the crystallinity of the functionalized silicate layers. The condensation reactions of the silanes involve the removal of water molecules from the edges of the inorganic layer of octahedral brucite and the hydrolysis products of silanes, a longer reflux period provides more time for these reactions resulting in improved crystallinity.

Advantageously, synthesizing the synthetic layered magnesium silicate allows the physical properties of the synthetic layered magnesium silicate to be tailored to meet desired specifications. Examples of the physical properties that can be tailored include the crystallinity, the organic moieties, the lateral dimensions, and combinations of the same. The crystallinity of the synthetic layered magnesium silicate can be tailored to possess low crystallinity, moderate crystallinity, or high crystallinity. The organic moieties can be tailored to include hydrophobic organic moieties, hydrophilic organic moieties, and a combination of the same. The lateral dimensions, such as the length, height and width, can be modified by increasing the reaction time. Tailoring the physical properties changes the thixotropic behavior, the viscosity of the well fluids, and combinations of the same. In at least one embodiment, tailoring the physical properties ensures the synthetic layered magnesium silicate contains enough structure to provide stability and viscosity in the well fluids.

The method of producing the synthetic functionalized additive is in the absence of step of grafting the organic moieties. Advantageously, the method of producing the synthetic functionalized additive provides a method for in-situ formation, which results in covalently linked silicon to oxide (Si—O) bonds. Covalently linked Si—O bonds have increased structural integrity exhibiting reduced likelihood of detachment of the organic moieties.

The synthetic functionalized additive can be used as a viscosifier, a thixotropic control additive, a suspension additive, a nucleating agent additive, and a release rate control additive. The synthetic functionalized additives can be used as additives in well fluids, paints, inks, cosmetic formulations, personal care formulations, synthesis of nanocomposites from thermoplastic or thermosetting polymers, and therapeutic formulations (sustained release). Well fluids can include drilling fluids, packer fluids, lost circulation fluids, production fluids, and combinations of the same. The well fluid can be an aqueous-based fluid, an oil-based fluid, or combinations of the same. In general, the synthetic functionalized additives can be used in place of organophilic nanosilicas.

In at least one embodiment the synthetic functionalized additive can be mixed with a well fluid as a viscosifier to produce a rheologically-modified well fluid. The amount of synthetic functionalized additive added to the well fluid can be between 1 gram and 3 grams and alternately between 1.5 grams and 2.5 grams. In at least one embodiment the synthetic functionalized additive in the well fluid is 2 grams. The amount of synthetic functionalized additive in the rheologically-modified well fluid can be in an amount between 0.1% w/v and 20% w/v, alternately 0.5% w/v and 5% w/v, alternately between 1% w/v and 4% w/v, alternately between 1.5% w/v and 3.5% w/v. In at least one embodiment the amount of the synthetic functionalized additive is 2% w/v. For example purposes only, a 0.1% w/v rheologically-modified well fluid can contain 0.1 grams of the synthetic functionalized additive in 99.9 mL of the well fluid. For example purposes only, a 20% w/v rheologically-modified well fluid can contain 20 g of the synthetic functionalized additive in 80 mL of the well fluid. The rheologically-modified well fluid can be injected into a well.

In at least one embodiment, the synthetic functionalized additive is used as an additive in paint compositions. Additives in paint compositions can include thixotropic agents, dispersants, and anti-settling agents. The synthetic functionalized additive can be used as one or more of these additives. The synthetic functionalized additive can be added to improve the stability of the paint composition or can be added to improve the application of the paint. The synthetic functionalized additive can improve the stability of the paint by increasing the length of time over which the solid particles remain suspended in the paint fluids and can increase the gel strength of the paint. The synthetic functionalized additive can be added as an anti-settling agent to reduce separation of the vehicle, also known as the binder including any diluent, from the solids, such as pigments. By reducing solids settling, the synthetic functionalized additive can increase the shelf-life of a paint composition. The longer the shelf-life of a paint composition, the more stable the paint composition. In an alternate embodiment, the synthetic functionalized additive can be used as an additive to impart hydrophobicity to the paint surface improving protection against moisture and water.

In at least one embodiment, the paint composition is a paint dispersion including the synthetic functionalized additive, a binder, and a pigment. The paint composition can further include resins, solvents, solid particles of metal oxides, clay minerals, and combinations of the same. The weight ratio of the synthetic functionalized additive to the binder is between 0.001 to 0.2 on a dry basis. The binder can be an acrylate-based binder or a latex-based binder. In a first step of producing the paint composition, the pigments can be mixed with the synthetic functionalized additive and any other additives to be incorporated in the paint composition, to produce a particle mix. The particle mix can then be mixed an amount of resins or solvents to produce a non-binding liquid. This is known as the mill-base stage. The non-binding liquid can then be mixed with the binder, such that the pigment disperses in the binder producing the paint composition. This is known as the let-down stage. Additional solvents, resins, and additives can be added during the let-down stage to achieve the desired properties of the paint composition, such as the color, sheen, drying time, consistency, and durability.

In at least one embodiment, the synthetic functionalized additive is used in cosmetic compositions as an emulsifying agent. Emulsifying agents can be used in cosmetic compositions to produce and maintain emulsions. The synthetic functionalized additive can be used in oil-in-water (O/W) emulsions, water-in-oil (W/O) emulsions, or multiple emulsions. In at least one embodiment, the cosmetic composition can be an O/W emulsion containing the synthetic layered magnesium silicate in the range between 0.1 wt % to 10 wt % of the O/W emulsion. The cosmetic composition can be produced by separately prepare the oil phase and the water phase. The purpose and desired properties of the cosmetic composition can dictate to which phase different ingredients are added. The synthetic functionalized additive can serve as a thickening agent, an emulsifier or a stabilizer. Other ingredients can include perfumes, color, and preservatives. The prepared oil phase and water phase can be mixed to form an emulsion. Mixing can continue until the emulsion is homogeneous. In certain embodiments, the mixing step can be performed at elevated temperature. The elevated temperature can be between 45° C. and 85° C.

In at least one embodiment, the synthetic functionalized additive is used as a viscosifier for oleophilic personal care formulations. In at least one embodiment, the synthetic functionalized additive is used to remove oil from water. In at least one embodiment, the synthetic functionalized additive is used as a nucleating agent additive for polymers.

EXAMPLES

Example 1

Example 1 includes a process to produce a synthetic functionalized additive. First, the magnesium-containing fluid was prepared by dissolving 15.0 grams (g) of the magnesium salt, magnesium chloride hexahydrate, in 300 milliliters (mL) of methanol, as the fluid medium, to produce the magnesium-containing fluid. Next, 18.3 mL of phenyltrimethoxysilane, as the silane, was added to the magnesium-containing fluid at room temperature, while stirring, to produce the reactant mix. The aqueous hydroxide was produced by dissolving 5.9 g of sodium hydroxide in 100 mL of de-ionized water. The aqueous hydroxide was added to the reactant mix at room temperature with continuous stirring over a period of 30 minutes (min) to produce the reaction mixture. The reaction mixture was a milky white suspension. The reaction mixture was stirred at room temperature for 5 hours. Following the mix time, the reaction mixture was refluxed at 70° C. for 48 hours. The refluxing apparatus included a stirring facility and a condenser, where cold water is circulated in the condenser during the refluxing step. Following the refluxing step, the product mix was cooled to a temperature between 35° C. and 40° C., filtered, washed three times with 100 mL of de-ionized water, and dried under vacuum at a temperature of 80° C. In total, 17.5 g of the synthetic functionalized additive was recovered. The synthetic functionalized additive of Example 1 was labeled MagSil-Phenyl.

The reaction in Example 1 occurred according to the following reaction:

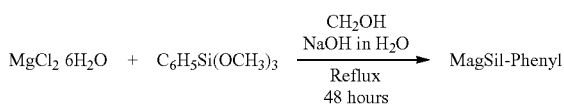

The functional group was a phenyl group.

Example 2

Example 2 was a comparison study of rheological properties of a commercial viscosifier, Geltone V® available from Halliburton (Houston, Tex.), to different samples of synthetic functionalized additive in a drilling fluid. The synthetic functionalized additives were MagSil-Phenyl, MagSil-C17, and MagSil-C3. MagSil-Phenyl was the synthetic functionalized additive of Example 1. MagSil-C17 was prepared with hexadecyltrimethoxysilane as the silane following a similar procedure as described in Example 1. MagSil-C3 was prepared with trimethoxy(propyl)silane as the silane following a similar procedure as described in Example 1. A drilling fluid having the composition of Table 1 was prepared according to the following method.

TABLE 1

Formulation of Oil-Based Drilling Fluid

| Component | Amount (g) |
| --- | --- |
| Diesel | 192 |
| Emulsifier[1] | 8 |
| Surfactant[2] | 4 |
| Lime | 6 |
| Polymer[3] | 2 |
| De-ionized Water | 22.48 |
| Saturated $CaCl_2$ brine | 53.27 |
| Filtration Control Resin[4] | 4 |
| Weighting material (Barite) | 209 |
| Total Weight | 500.75 |

[1]VERSAMUL ® available from MiSWACO (Houston, TX)
[2]VERSACOAT ™ available from MiSWACO (Houston, TX)
[3]Priamine ™ 1074 available from Croda International (Chino Hills, CA)
[4]VERSATROL ® HT available from MiSWACO (Houston, TX)

In a first step, 2 g of the viscosifier was added to the diesel and mixed for 1-2 minutes. Then, the VERSAMUL®, VERSACOAT™, lime, and Priamine™ 1074 were added in succession, with 1-2 minutes of mixing in between each addition. The mixture was subjected to a shear stress for 20 minutes. Following the shear stress, a solution of the calcium chloride brine in the de-ionized water was added to the mixture followed by 1-2 minutes of mixing. Then, the VERSATROL® HT was added followed by shear stress for 20 minutes. Next, the barite was added followed by shear stress for 20 minutes.

The specific gravity of each viscosifier sample was measured and is shown in Table 2.

TABLE 2

Specific gravity of each viscosifier sample

| Sample | Viscosifier | Specific Gravity |
| --- | --- | --- |
| Sample 1 | MagSil-Phenyl | 1.5 |
| Sample 2 | MagSil-C17 | 1.6 |
| Sample 3 | MagSil-C3 | 1.8 |
| Sample 4 | Geltone V | 1.6 |

Finally, 20 g of Rev Dust™, a calcium montmorillonite, available from Newpark Drilling Fluids (Katy, Tex.) was added followed by shear stress for 5 minutes. The Rev Dust was added to simulate cuttings during a drilling process. After the final shear stress application, the entire mixture was aged by hot rolling the drilling fluid at 275° F. under 500 pounds per square inch (psi) pressure in a pressure vessel.

Figure 3:
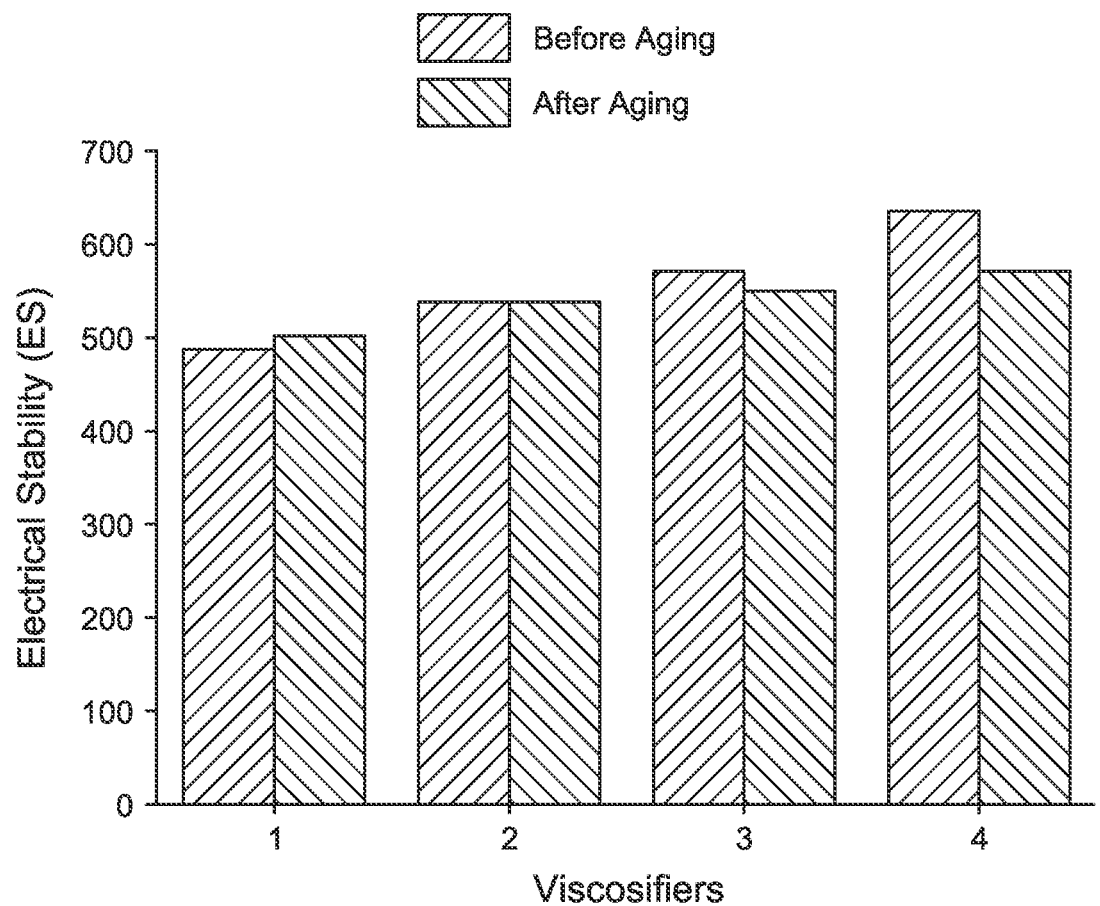
FIG. 3 is a graph of the results of the electrical stability test of Example 2.

The electrical stability (ES) of each sample was measured before and after aging using an electrical stability tester from the Fann Instrument Company. The results are shown in FIG. 3. FIG. 3 indicates that the electrical stability of Samples 1-3 with the synthetic functionalized additives are comparable to Sample 4 with the commercial viscosifier. The greater the ES value, the greater the indication of a stable inverted emulsions. The stable inverted emulsion was composed of a brine-in-diesel system. The synthetic functionalized additives increase the viscosity in the continuous (diesel) phase and therefore stabilized droplets of brine in the diesel. The stabilized droplets of brine separated in the diesel phase results in a greater ES value observed. A lower ES means the continuous (diesel) phase does not have sufficient viscosity to separate each droplet of brine.

Figure 4A:
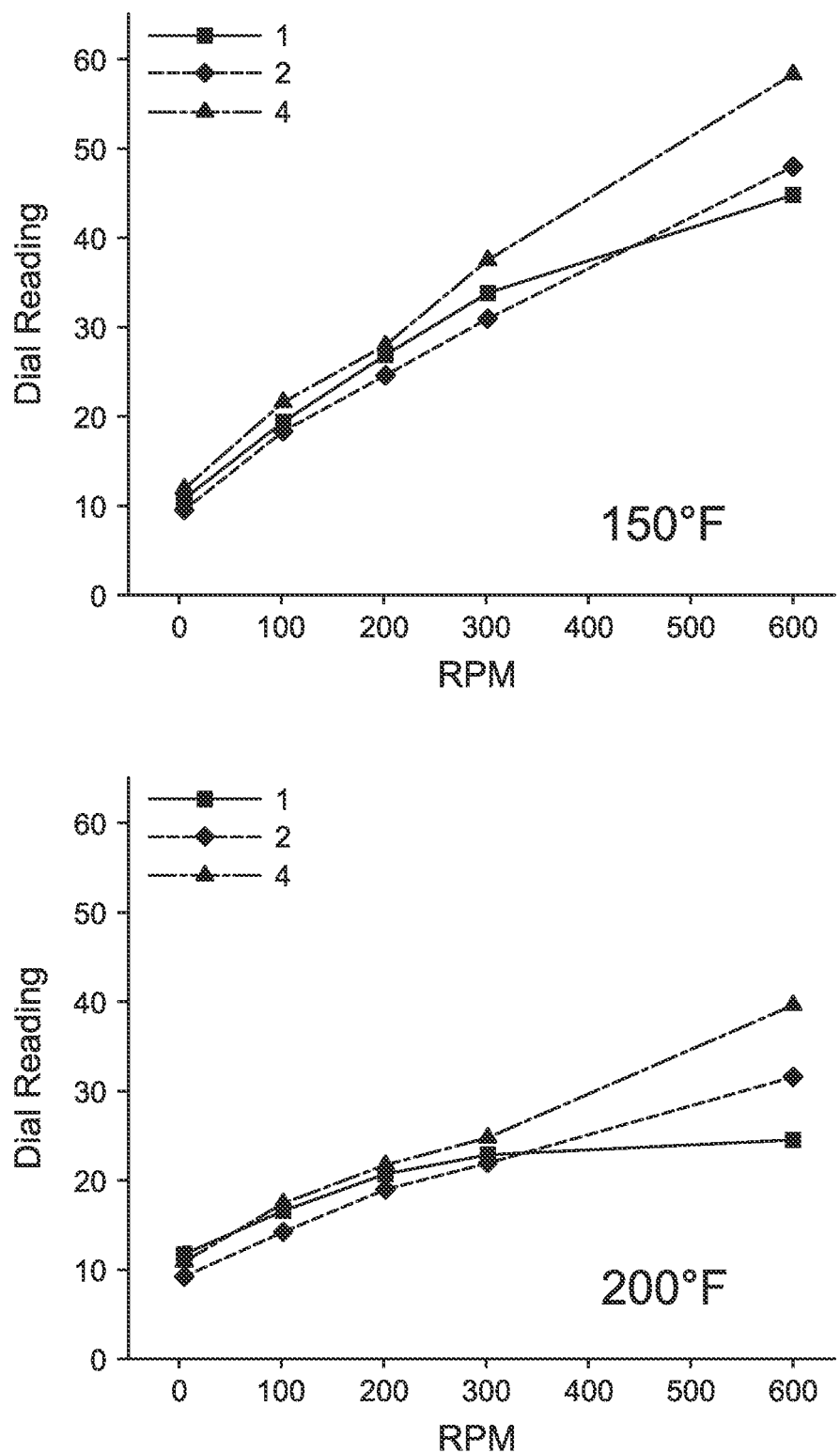
FIG. 4A is graphs of the results of Example 2 of the low shear dial readings versus speed at different temperatures.
Figure 4C:
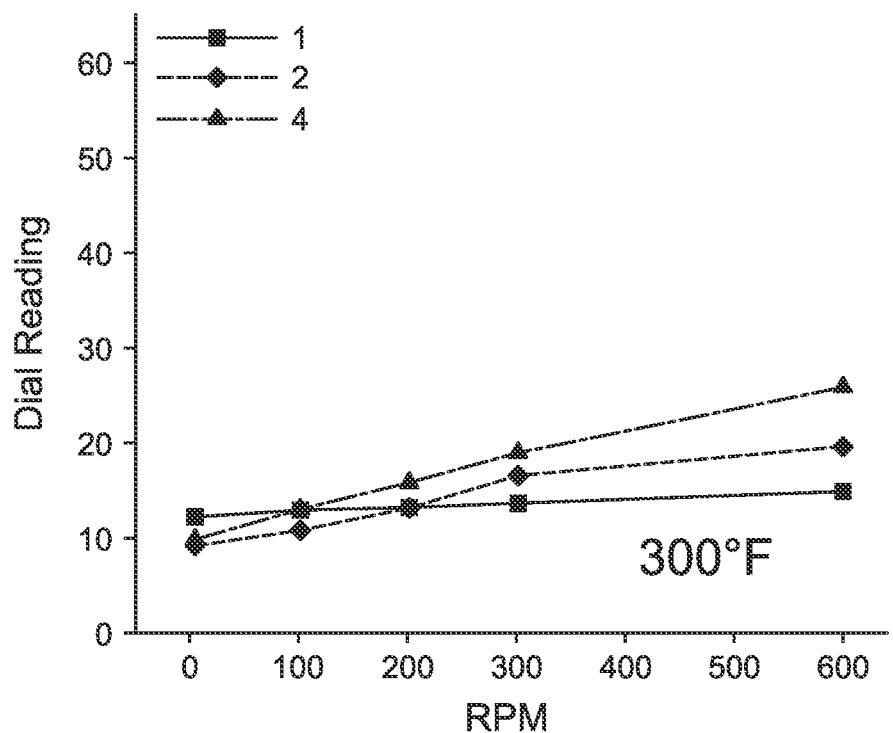
FIG. 4C is a graph of the results of Example 2 of the low shear dial readings versus speed at different temperatures.

Rheological properties of Samples 1, 2 and 4, including plastic viscosity, apparent viscosity, and yield point, were measured under pressure of 10,000 psi at different temperatures, 150° F., 200° F., 250° F., 275° F., and 300° F. The measurements were performed using a rheometer from the Fann Instrument Company. The raw results showing the low shear dial readings at different RPM's for each temperature are shown in FIGS. 4A-4C. The results show that rheologically-independent behavior can be achieved using the synthetic functionalized additives at different temperatures under 10,000 psi pressure. The results suggest drilling fluids with the synthetic functionalized additive would be suitable for use at wellbore temperatures and pressures. For example, at 200° F., Sample 1 exhibits only a small increase in dial reading from 200 RPM to 600 RPM. In contrast, Sample 4 exhibits a greater increase (about 20) from 200 RPM to 600 RPM. Moreover, the results illustrate that the functional groups remain covalently bonded to the synthetic layered magnesium silicate and do not detach.

Figure 5:
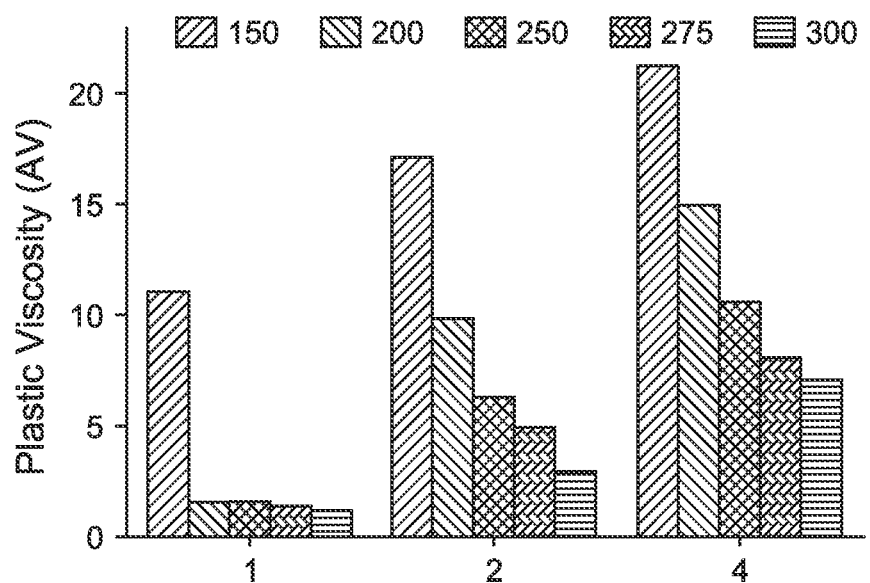
FIG. 5 is a graph of the results showing plastic viscosity at different temperatures for Example 2.
Figure 6:
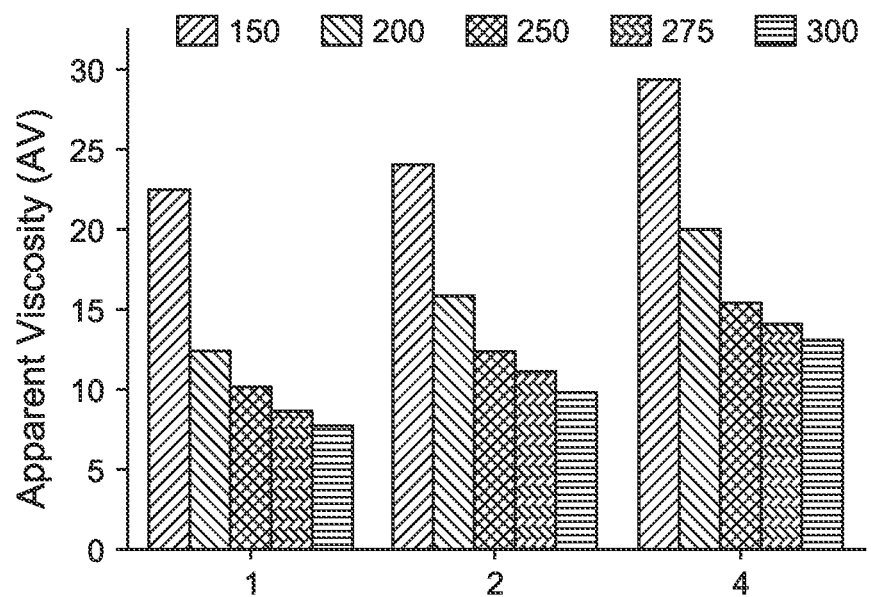
FIG. 6 is a graph of the results showing apparent viscosity at different temperatures for Example 2.
Figure 7:
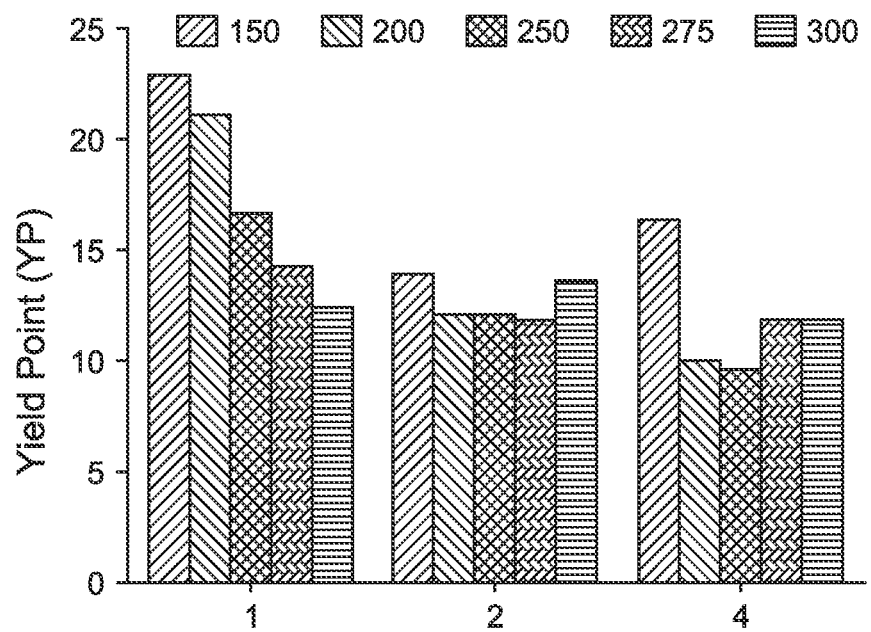
FIG. 7 is a graph of the results showing yield point at different temperatures for Example 2.

The results for plastic viscosity, apparent viscosity, and yield point are described with reference to FIGS. 5-7. In FIG. 5, the plastic viscosity (PV) on the y-axis is a measure of the dial reading at 600 revolutions per minute (RPM) minus the dial reading at 300 RPM. In FIG. 6, the apparent viscosity (AV) on the y-axis is a measure of the dial reading at 600 RPM divided in half. In FIG. 7, the yield point on the y-axis is a measure of the dial reading at 300 RPM minus the PV. The rheological properties can be used to develop a drilling fluid for a specific wellbore application, thus knowing the rheological properties is valuable to producing application specific drilling fluids.

Although the embodiments have been described in detail, it should be understood that various changes, substitutions, and alterations can be made hereupon without departing from the principle and scope. Accordingly, the scope of the embodiments should be determined by the following claims and their appropriate legal equivalents.

There various elements described can be used in combination with all other elements described here unless otherwise indicated.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed here as from about one particular value to about another particular value and are inclusive unless otherwise indicated. When such a range is expressed, it is to be understood that another embodiment is from the one particular value to the other particular value, along with all combinations within said range.

As used here and in the appended claims, the words "comprise," "has," and "include" and all grammatical variations thereof are each intended to have an open, non-limiting meaning that does not exclude additional elements or steps.

That which is claimed is:

1. A composition of a synthetic functionalized additive, the composition comprising:
    a synthetic layered magnesium silicate, the synthetic layered magnesium silicate comprising:
        a first functionalized silicate layer, the first functionalized silicate layer comprising a tetrahedral silicate layer and a functional group,
        an octahedral brucite layer, the octahedral brucite layer comprising magnesium oxide/hydroxide, and
        a second functionalized silicate layer, the second functionalized silicate layer comprising the tetrahedral silicate layer and the functional group,
        where the octahedral brucite layer is positioned between the first functionalized silicate layer and the second functionalized silicate layer; and
    the functional group, the functional group covalently bonded to the tetrahedral silicate layer of the first functionalized silicate layer and separately covalently bonded to the tetrahedral silicate layer of the second functionalized silicate layer, where the functional group extends from both the first functionalized silicate layer and the second functionalized silicate layer away from the octahedral brucite layer, where the functional group is selected from the group consisting of saturated alkyl groups having the formula ($-CH_2(CH_2)_xCH_3$), where x is an integer between 0 and 18, phenyl groups, amine groups, diamine groups, carboxylate groups, amide groups, acrylate groups, thiol groups, methacrylate groups, isocyanate groups, and combinations of the same.

2. The composition of claim 1, where a thickness of the synthetic layered magnesium silicate is 1 nanometer, where a lateral dimension of the synthetic layered magnesium silicate is between 2 nm and 5 microns.

3. A method of using a synthetic functionalized additive in a well fluid, the method comprising the steps of:
    preparing a well fluid, where the well fluid is selected from aqueous-based fluids, oil-based fluids, and combinations of the same;
    adding an amount of the synthetic functionalized additive to the well fluid to produce a rheologically-modified well fluid, where the synthetic functionalized additive comprises:
        a synthetic layered magnesium silicate comprising:
            a first functionalized silicate layer, the first functionalized silicate layer comprising a tetrahedral silicate layer and a functional group,
            an octahedral brucite layer, the octahedral brucite layer comprising magnesium oxide/hydroxide, and
            a second functionalized silicate layer, the second functionalized silicate layer comprising the tetrahedral silicate layer and the functional group,
            where the octahedral brucite layer is positioned between the first functionalized silicate layer and the second functionalized silicate layer, and
        a functional group, where the functional group is covalently bonded to the synthetic layered magnesium silicate, where the functional group is selected from the group consisting of saturated alkyl groups having the formula ($-CH_2(CH_2)_xCH_3$), where x is an integer between 0 and 18, phenyl groups, amine groups, diamine groups, and combinations of the same;
    subjecting the rheologically-modified well fluid to a shear stress; and
    injecting the rheologically-modified well fluid into a well.

4. The method of claim 3, where the amount of the synthetic functionalized additive in the rheologically-modified well fluid is between 0.1% w/v to 20% w/v.

5. The method of claim 3, where the rheologically-modified well fluid is operable to exhibit rheologically-independent behavior.

* * * * *